United States Patent [19]

Hughes et al.

[11] Patent Number: 4,596,410
[45] Date of Patent: Jun. 24, 1986

[54] BEADLOCK WRENCH FLOAT FITTING

[75] Inventors: Brett A. Hughes, VanWert; David L. Gilbert, Paulding; Eugene A. Ellerbrock, Columbus Grove, all of Ohio

[73] Assignee: Aeroquip Corporation, Jackson, Mich.

[21] Appl. No.: 613,274

[22] Filed: May 24, 1984

[51] Int. Cl.[4] .............................................. F16L 35/00
[52] U.S. Cl. ...................................... 285/39; 285/330; 285/254; 285/903
[58] Field of Search .................. 285/39, 330, 256, 259, 285/DIG. 4

[56] References Cited

U.S. PATENT DOCUMENTS

| 1,234,609 | 7/1917 | Bernard. | |
|---|---|---|---|
| 1,678,640 | 7/1928 | Hall. | |
| 1,768,095 | 6/1930 | Arthur. | |
| 2,077,869 | 4/1937 | Bennett. | |
| 2,175,575 | 10/1939 | Shoemaker | 285/39 |
| 2,241,245 | 5/1941 | Daniels | 285/DIG. 4 |
| 2,437,933 | 3/1948 | Brennan. | |
| 4,064,614 | 12/1977 | Horvath | 285/256 X |

FOREIGN PATENT DOCUMENTS 2046389 11/1980 United Kingdom .................. 285/39

Primary Examiner—Richard J. Scanlan, Jr.
Attorney, Agent, or Firm—Beaman & Beaman

[57] ABSTRACT

The invention pertains to the attachment of a wrenching nut to a metal conduit wherein torque forces can be applied to the conduit through the nut. An annular nut member is located upon a conduit and the conduit is radially deformed to force the conduit material into engagement with keying surfaces defined upon the nut. Conduit deformation occurs on both sides of the nut for axial positioning thereof, as well as establishing a torque transmitting relationship between the nut and conduit.

3 Claims, 4 Drawing Figures

BEADLOCK WRENCH FLOAT FITTING

BACKGROUND OF THE INVENTION

Fittings are commonly defined upon conduit ends permitting interconnection of conduits, or attachment thereof to other fittings, adapters, hose, etc. Most conduit fittings utilize threads for attachment, or the assembly of hose fittings to metal conduits, and accordingly, rotational torque forces are often applied to the conduit and its associated fittings or components. Such torque forces are commonly resisted by the use of a wrench engaging wrench flats fixed relative to the conduit.

In the past, wrench flats on conduits have been defined upon nipples or adapters soldered, brazed, swaged, or otherwise mechanically attached to the conduit, and it is also known to shape the conduit material, itself, into a noncircular configuration throughout a limited axial length to form parallel flat surfaces suitable for wrench engagement. It is also known to braze, solder or weld wrenching nuts or rings to cylindrical elements such as a conduit to permit torque transfer members to be applied thereto.

Prior art devices of the aforedescribed types, especially those requiring heat, are expensive to fabricate, requiring rather complex secondary operations including heating and cooling stages.

It is an object of the invention to attach wrenching means to a metal conduit by a simple mechanical process not requiring external heat.

Another object of the invention is to provide a method for attaching a wrenching nut to a deformable metal conduit wherein the conduit metal is radially deformed into a mechanical relationship with a wrenching nut.

Yet another object of the invention is to provide a method of affixing a wrenching nut to a deformable metal conduit wherein only the material of the conduit is utilized to produce a mechanical interconnection with the nut, and the process may be quickly and economically achieved.

Another object of the invention is to produce an assembly between a metal conduit and a wrenching nut wherein the conduit material is outwardly radially deformed into engagement with keying recesses defined in lateral sides of the nut which include radially disposed surfaces effectively capable of establishing a torque transmitting relationship between the nut and conduit.

In the practice of the invention a deformable metal conduit, such as of soft steel, copper, brass, aluminum, or the like, receives an annular wrenching nut slipped thereover. The nut includes an outer periphery having wrench-engageable flats defined thereon, usually of a hexagon configuration, and the lateral sides of the nut include recesses having surfaces of a generally radial orientation.

Upon the nut being axially positioned on the conduit as desired, the conduit is radially deformed in the region of the nut in an outward direction by the application of axial forces thereto. This outward deformation of the conduit throughout its circumference forces the conduit material into engagement with the nut on each lateral side axially positioning the nut. Further, the deformed conduit material enters the nut recesses and engages the radial surfaces thereof which prevents relative rotation between the nut and conduit permitting the transmission of torque forces therebetween.

The desired directional flow of the conduit material during deformation is achieved by dies surrounding the conduit worked portion, and if desired, axial forces may be applied to the deformed conduit material to assure initimate contact of the conduit material with the nut lateral sides.

The practice of the invention permits an effective mechanical interconnection between a wrenching nut and a conduit without the application of external heat or bonding materials.

BRIEF DESCRIPTION OF THE DRAWINGS

The aforementioned objects and advantages of the invention will be appreciated through the following description and accompanying drawings wherein.

DESCRIPTION OF THE PREFERRED EMBODIMENT

Figure 1:
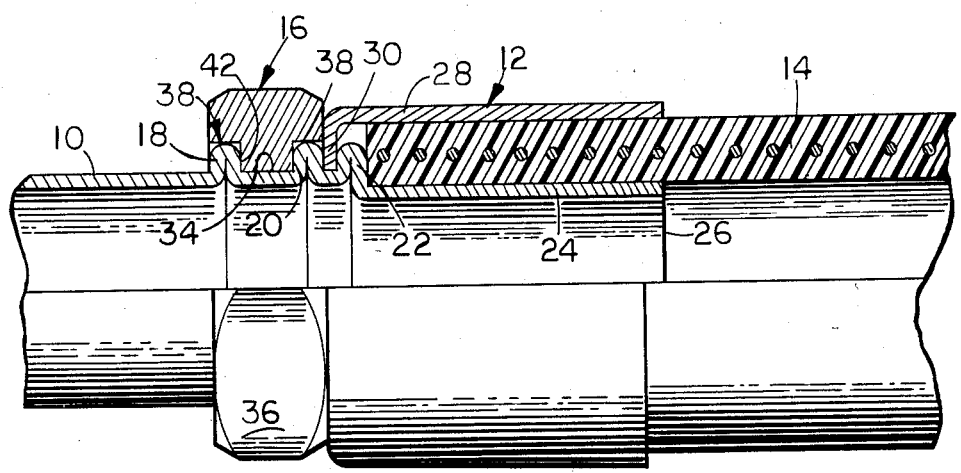
FIG. 1 is an elevational view, partially sectioned, illustrating a conduit and wrenching nut assembly in accord with the invention as taken along Section I—I of FIG. 3.
Figure 2:
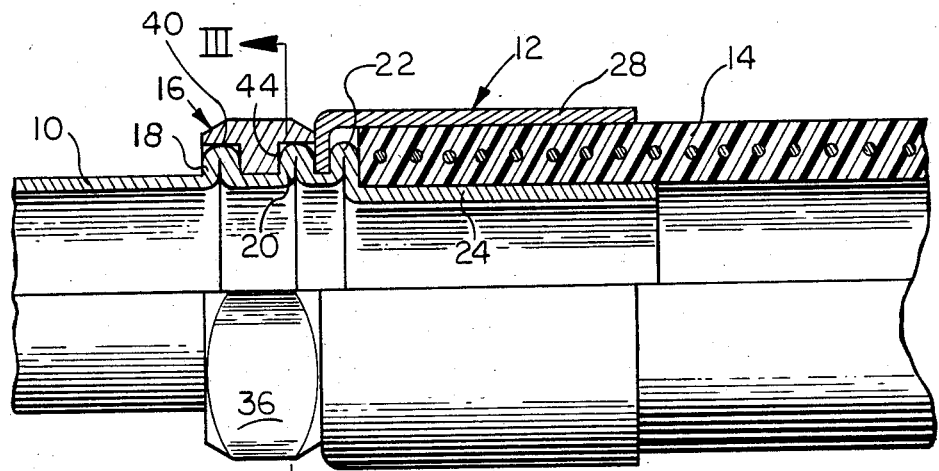
FIG. 2 is an elevational view, partially sectioned, as taken along Section II—II of FIG. 3.
Figure 3:
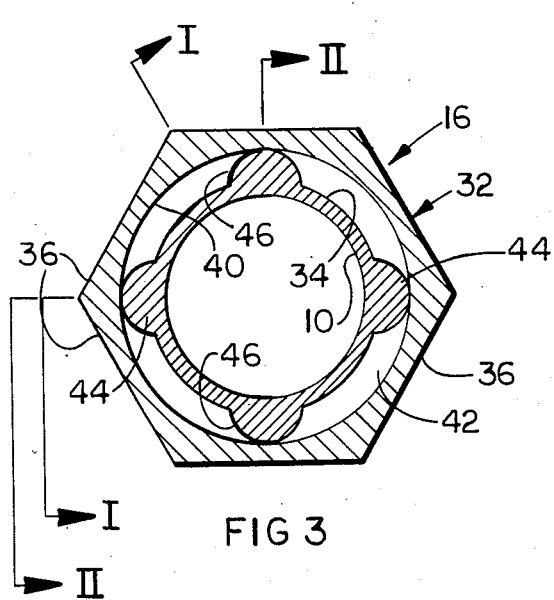
FIG. 3 is an elevational, sectional view as taken along Section III—III of FIG. 2.

A metal conduit is shown at 10, and the conduit is of a relatively thin wall type, usually formed of soft steel, copper or aluminum. As shown in FIGS. 1 and 2, the complete assembly includes the conduit 10, a socket 12, a hose 14 and the wrenching nut 16.

The conduit is formed with a plurality of outwardly disposed circumferential portions 18, 20 and 22, three in the disclosed embodiment, and the cylindrical portion 24 of the conduit is of a reduced diameter adjacent end 26 defining a nipple receiving the hose 14.

The annular sheet metal socket 12 includes a cylindrical skirt portion 28 in radial alignment with the nipple 24, and socket flange 30 is affixed to the conduit by the conduit deformation portion 22, as later described. The hose 14 is received between the nipple 24 and socket 12, and the socket skirt 28 may be swaged or crimped upon the hose to firmly compress the hose on the conduit nipple portion as is well known in the hose fitting art.

The wrenching nut 16 is of an annular configuration including an outer periphery 32 and an inner cylindrical bore 34. The periphery 32 is of a noncircular configuration, preferably hexagonal, defining a plurality of wrench-engageable flats 36. The bore 34 is of a diameter only slightly greater than the normal outer diameter of the conduit 10, whereby the nut may be readily inserted over the end of the conduit and axially located thereon.

The lateral sides of the wrenching nut 16 are identically formed, and each include an annular counterbore 38 of cylindrical form having a diameter as indicated at 40. The counterbores include a radial surface 42, and a plurality of recesses 44 are formed in the nut intersecting the surface 42, FIG. 4.

Figure 4:
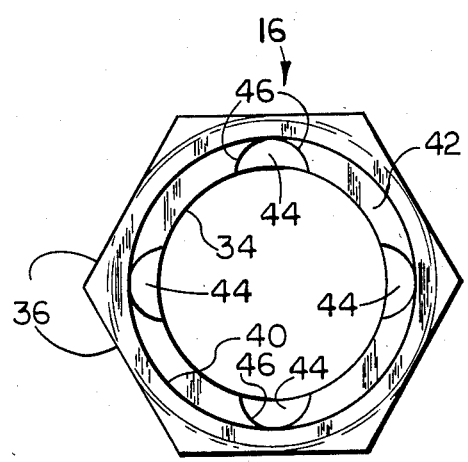
FIG. 4 is an elevational view of the wrenching nut, per se.

As will be appreciated from FIG. 4, the recesses 44, four being shown in the illustrated embodiment, within each counterbore, are of semi-circular configuration and include shoulder surfaces 46 which are of a generally radial orientation with respect to the center of the nut. The surfaces 46 form abrupt transitions in the configuration of the nut surfaces 42, and serve as keying means capable of transmitting torque forces between the wrenching nut and the conduit.

To produce the assembly illustrated in FIGS. 1 and 2, the wrenching nut 16 is positioned upon the conduit 10 at a desired axial location relative to the end 26. Thereupon, the socket 12 is positioned adjacent the wrenching nut, and the three component assembly is located within a press, not shown, which imposes an axial force upon the conduit 10. Appropriate metal confining dies, not shown, are disposed adjacent the conduit and nut during the upsetting of the conduit, and as the axial force is applied to the conduit, circumferential conduit material deformations 18, 20 and 22 are produced. Simultaneously, the reduced diameter of the nipple portion 24 is formed.

The deformations 18 and 20 occur within the nut counterbore 38, and of course, the conduit will expand into tight engagement with the nut bore 34. The radial deformation of the conduit material into portions 18 and 20 causes the material to enter the recesses 44, and the forces are such that the recesses will be substantially filled with the conduit material.

Simultaneously, the deformation 22 occurring on the inside of the socket flange 30, and the radial expansion of the conduit at the bore of the socket flange, firmly mechanically affixes and positions the socket upon the conduit.

The reception of the conduit material into the recesses 44, and the intimate engagement of the conduit material with the recess shoulder surfaces 46 produces a torque transmitting interconnection between the wrenching nut and the conduit. If desired, the deformations 18, 20 and 22 may be further subjected to axial forces which will "compress" the deformations toward each other assuring full and intimate reception of the material of deformations 18 and 20 into the recesses 44.

It is to be appreciated that the keying means defined in the lateral sides of the wrenching nut may take a variety of forms. For instance, the counterbores 38 could be of a noncircular configuration wherein deforming of the conduit material thereinto will prevent rotation of the nut upon the conduit. Likewise, slots and slits may be defined in the nut for providing surfaces engageable with the conduit deformed material capable of transmitting torque.

After the assembly of the conduit, socket and nut has occurred, the hose 14 may be inserted within the annular space between the socket skirt 28 and the nipple 24, and the socket skirt is swaged or crimped upon the hose to complete the attachment of the hose to the conduit 10.

In some applications, it may be desired to attach a wrenching nut to the conduit, without affixing a hose receiving socket thereto. In such instances only two deformations are produced in the conduit, on opposite sides of the wrenching nut. It is appreciated that a variety of embodiments of the inventive concepts may be apparent to those skilled in the art without departing from the spirit and scope of the invention.

We claim:

1. A conduit and wrenching nut assembly comprising, in combination, a metal conduit having a deformable side wall having an outer diameter, an annular wrenching nut mounted upon said conduit, said nut including a noncircular periphery, an axis, axially spaced first and second ends, and an axial bore of a diameter slightly larger than said outer diameter of said conduit, a first annular counterbore defined in said nut first end intersecting said bore and concentric to said bore and said axis defining an axially extending surface and a radially extending first lateral nut side, at least one axially extending blind recess defined in said nut lateral side intersecting said nut bore, said recess being partially defined by radially extending shoulders, said conduit side wall including a first outwardly deformed portion firmly received within said wrenching nut recess keying said nut to said conduit preventing relative rotation therebetween and engaging said first lateral side axially positioning said nut upon said conduit.

2. In a conduit and wrenching nut assembly as in claim 1, a plurality of said recesses defined within said first lateral side of said nut.

3. In a conduit and wrenching nut assembly as in claim 2, a second annular counterbore defined in said nut second end intersecting said bore and concentric to said bore and said axis defining an axially extending surface and a radially extending second lateral nut side, a plurality of axially extending blind recesses defined in said second lateral side intersecting said nut bore, each recess being partially defined by radially extending shoulders, said conduit side wall including a second outwardly deformed portion firmly received within said recesses within said second lateral side and engaging said second lateral side whereby said nut is axially positioned on said conduit intermediate said first and second conduit deformed portions.

* * * * *